Feb. 11, 1958     A. A. MORICI     2,822,842
TOMATO TREATING MACHINE
Filed Sept. 6, 1956     2 Sheets-Sheet 1
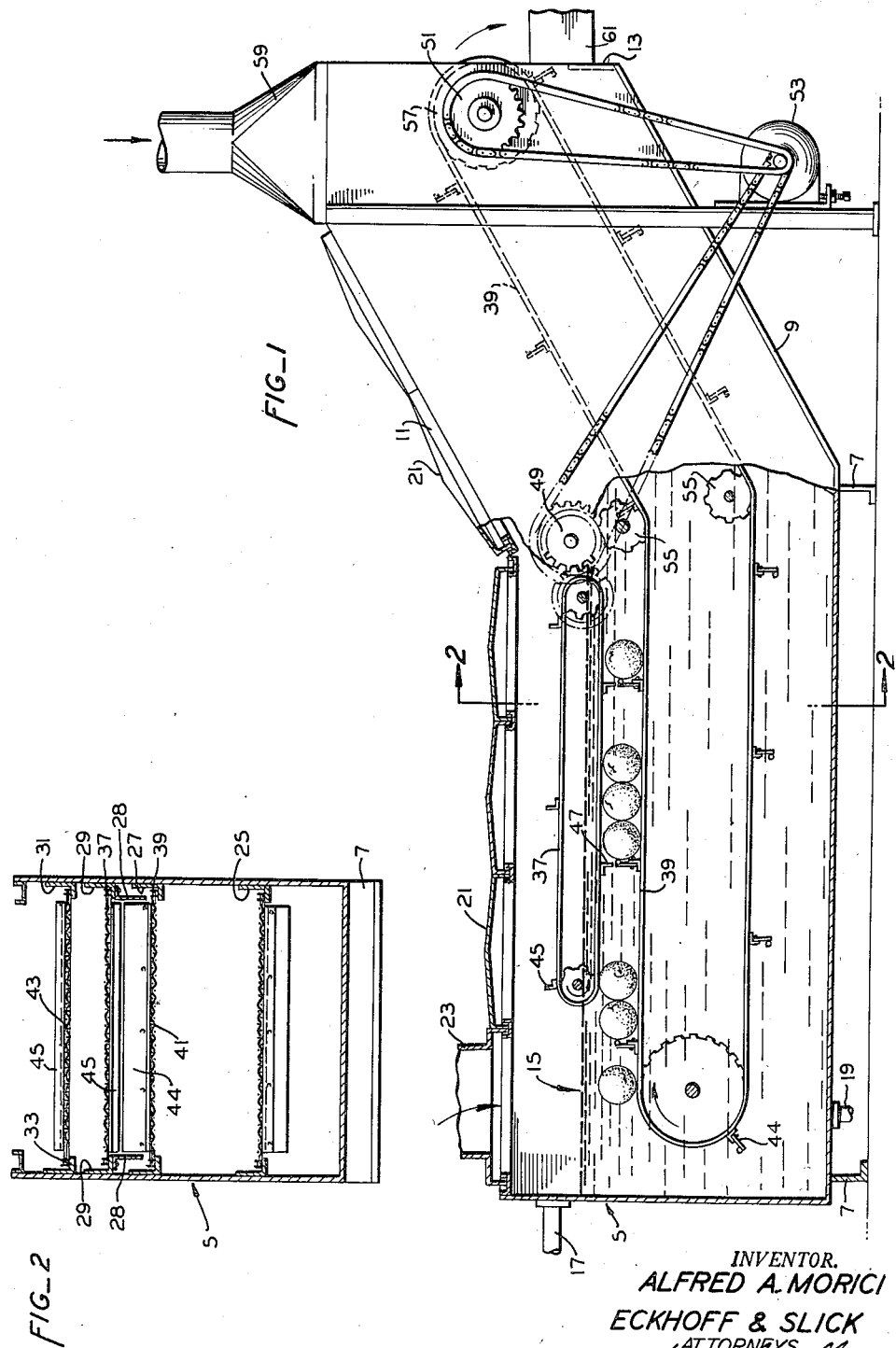
INVENTOR.
ALFRED A. MORICI
ECKHOFF & SLICK
ATTORNEYS
BY A MEMBER OF THE FIRM Feb. 11, 1958  A. A. MORICI  2,822,842
TOMATO TREATING MACHINE
Filed Sept. 6, 1956  2 Sheets-Sheet 2
FIG_3
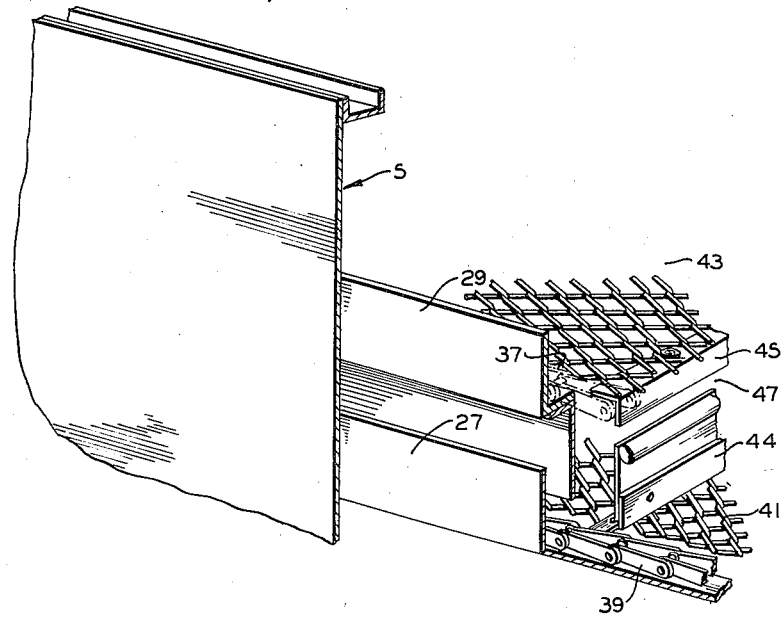
INVENTOR.
ALFRED A. MORICI
ECKHOFF & SLICK
ATTORNEYS
BY
A MEMBER OF THE FIRM

United States Patent Office 2,822,842
Patented Feb. 11, 1958

2,822,842
TOMATO TREATING MACHINE

Alfred A. Morici, San Jose, Calif., assignor to Hershel California Fruit Products Co., Inc., a corporation of California Application September 6, 1956, Serial No. 608,304

1 Claim. (Cl. 146—47)

This invention relates to a machine for treating a soft, delicate skinned fruit such as tomatoes. During the processing of tomatoes, it is necessary that the skins be removed therefrom. It is well-known that tomatoes have relatively tough skins, yet the flesh of the tomato is very soft and perishable so it is necessary to apply relatively delicate treating means to the processing of tomatoes.

In accordance with the present invention, it has been found that tomatoes may have their skins loosened, so that a subsequent operation can easily remove the skins, by first immersing the tomatoes in a warm lye bath, and subsequently immersing the tomatoes suddenly in cold water. The lye starts disintegration of the skin, and the shock of hitting the cold water results in a rupture and loosening of the skin of the tomato, so that the skin may be readily removed.

In accordance with the present invention, a lye treatment apparatus is provided for tomatoes which will handle a large number of tomatoes on a continuous production line basis, yet wherein the tomatoes are positively immersed in a lye bath and wherein they are delicately handled and the fruit is not injured.

In the drawings forming a part of this application:

Figure 1 is an elevational view, partly in section with parts broken away, of the tomato-treating device of the present invention.

Figure 2 is a sectional view on the lines 2—2 of Figure 1.

Figure 3 is an enlarged perspective view, partly in section, showing the manner in which the mesh belts operate in the machine of the present invention.

Referring now to the drawings by reference characters, there is shown a tank, generally designated 5, having suitable support members 7. One end of the tank has a sloping bottom, as at 9, and the top frame of the tank 11 is also elevated at this end. The bottom 9 terminates in a baffle 13 so that a lye solution can be maintained, as at 15, in the tank, and will not overflow from the tank. An inlet 17 and an outlet 19 are provided for the tank, and the lye solution is circulated and kept at the desired strength by pH controllers, not illustrated. The top of the tank has a series of removable covers 21 so that fumes will be retained within the tank.

At one end of the tank, there is provided an opening 23 so that tomatoes may be fed into the tank. Within the tank, there are a series of horizontal guide members, designated 25, 27, 29 and 31. The guide members terminate in in-turned ledges 33, which are adapted to support a movable chain, as is further described hereinafter. In addition, the guide members 29 have a down-turned baffle 28, which prevents contact of the tomatoes with the drive chain. Within the tank, two pairs of movable chains, one an upward chain 37 and the other a lower chain 39, are provided, each pair of chains carrying a wire mesh therebetween. The wire mesh for the lower chain is designated 41, while that for the upper chain is designated 43. Each pair of chains is provided with spaced angular pushing members 44 and 45, which are synchronized and thus move together, as is shown at 47. The upper chain 37 is driven through the sprocket 49, while the lower chain is driven by the sprocket 51, both sprockets being in turn driven by a prime mover 53. The lower chain 39 is provided with a pair of idler rollers 55 and an end driving roller 57, so that the lower chain travels horizontally during a portion of its path and is then caused to turn upwardly, as is shown in the drawing. The outlet end of the tank is also provided with a fume hood 59 so that caustic fumes may be withdrawn by means of a fan, not shown. Adjacent the end roller 57 is a chute 61, which serves to receive tomatoes as they are discharged from the belt 39, and to convey them to a flume of cold water, not shown.

Since the chains 37 and 39 are synchronized, the fruit is not subjected to rough handling. The fruit enters as at 23 and is retained by one of the lugs 44 on the lower belt and is brought to a position under the upper belt 37 where the mating lug 45 forms a closed space with the bottom lug. Further, the baffles 28 keep the tomatoes from contacting the drive chain 39. In this way, the fruit is positively propelled without being subjected to rolling or turning and is yet kept under the surface of the caustic. After the fruit passes the sprocket 55, it is gently raised out of the caustic bath by the belt 39 and is then discharged onto the member 61, whereupon it is immediately quenched in a flume of cold water, not shown, resulting in the desired skin-loosening action.

I claim:

An apparatus for treating tomatoes or the like in a submerged bath comprising an elongated tank, said tank having a long horizontal portion and being raised at one end, an aqueous layer in said tank, a first pair of parallel chains having a continuous mesh screen and a series of spaced lugs therebetween, driving means for propelling said chains through said solution in the horizontal portion of said tank and guide means for lifting the chains out of the solution at the raised end of the tank, a second pair of parallel chains located above said first pair of parallel chains, said second pair of parallel chains having continuous mesh therebetween and lugs thereon spaced at the same distance as the lugs on the first chain, synchronizing drive means connecting said first and second parallel chains causing said chains to move through the bath at the same rate of speed, said synchronizing means causing said lugs to mate with one another, said mesh on the first pair of chains supporting fruit and the mesh on the second pair of chains going over the top of the fruit and maintaining it in an immersed condition throughout a substantial portion of its travel through said bath.

References Cited in the file of this patent

UNITED STATES PATENTS

| | | |
|---|---|---|
| 1,381,107 | Cwirko | June 14, 1921 |
| 1,598,435 | Gottschalk | Aug. 31, 1926 |
| 2,306,805 | Haynie | Dec. 29, 1942 |
| 2,391,630 | Kibler | Dec. 25, 1945 |